United States Patent [19]
Burden et al.

[11] 3,903,737
[45] Sept. 9, 1975

[54] APPARATUS FOR TESTING STARTER MOTORS

[75] Inventors: Walter Burden; James Mundo, both of Chicago, Ill.

[73] Assignee: Burden Automotive Electric, Incorporated, Chicago, Ill.

[22] Filed: Mar. 20, 1974

[21] Appl. No.: 452,733

[52] U.S. Cl. .................................. 73/118; 73/135
[51] Int. Cl.² ...................................... G01M 15/00
[58] Field of Search ............ 73/135, 118; 188/219.6

[56] References Cited
UNITED STATES PATENTS

| | | | |
|---|---|---|---|
| 2,579,804 | 12/1951 | Dotson | 73/135 X |
| 2,911,822 | 11/1959 | Frazier et al. | 73/135 X |
| 3,312,105 | 4/1967 | Amtsberg | 73/135 |

*Primary Examiner*—Jerry W. Myracle
*Attorney, Agent, or Firm*—Lester N. Arnold

[57] ABSTRACT

A test stand for electric starter motors utilizes a drive gear attached to a main rotatable shaft to engage the pinion gear of the starter motor for turning a brake drum mounted on the main shaft. A curvalinear outer brake shoe moves on a pivot axis to engage or disengage the spinning brake drum. Improved means are provided for mounting a number of different types of starter motors by providing different size adapter rings and an auxiliary drive gear. Improved spring biasing means are provided for biasing the shoe onto the drum, adjustments thereof providing a predeterminable torque load for the starter motor. Positionable lever means are provided to permit the adjusted torque load to optionally be lessened or increased for further testing of the starter motor.

5 Claims, 7 Drawing Figures

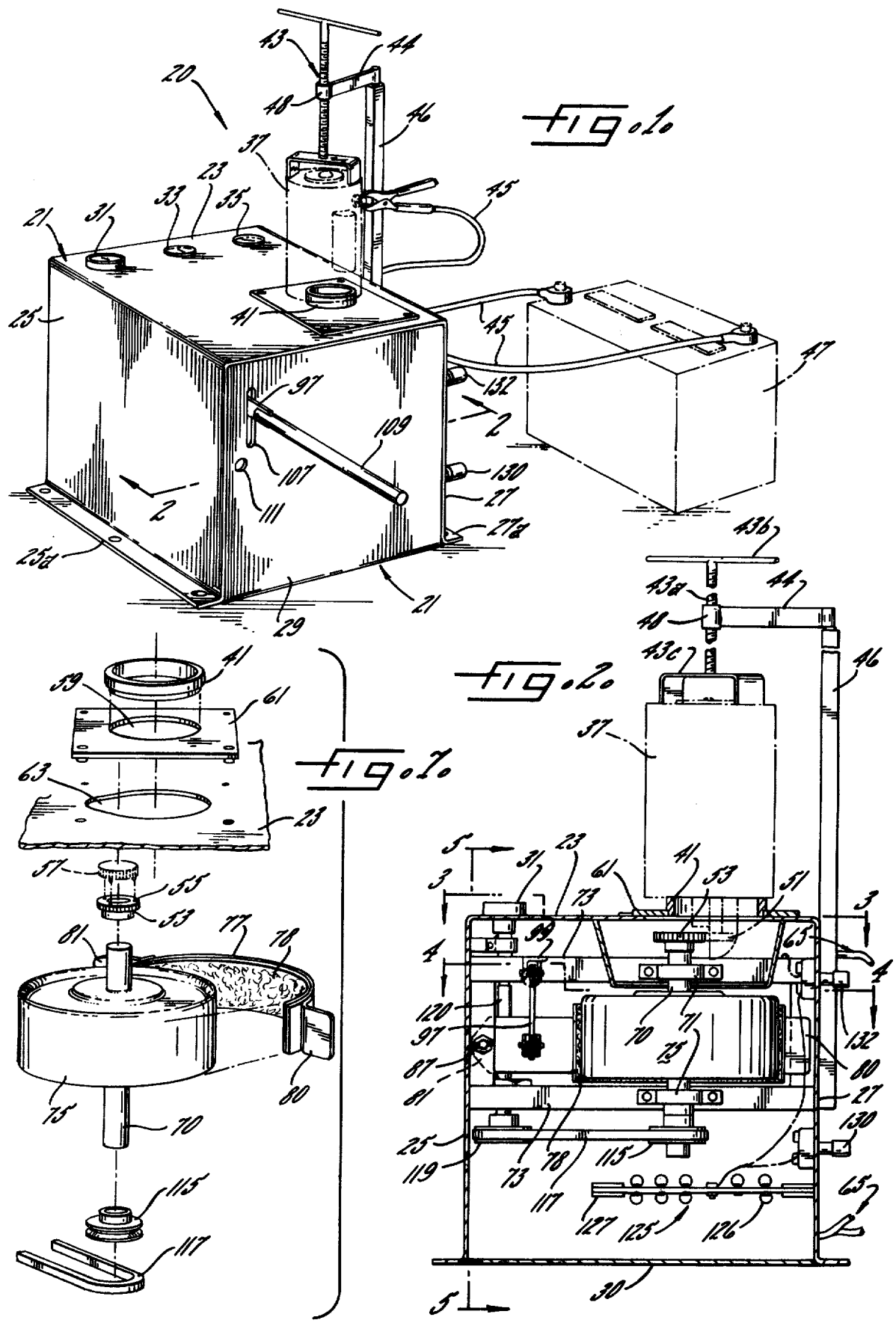

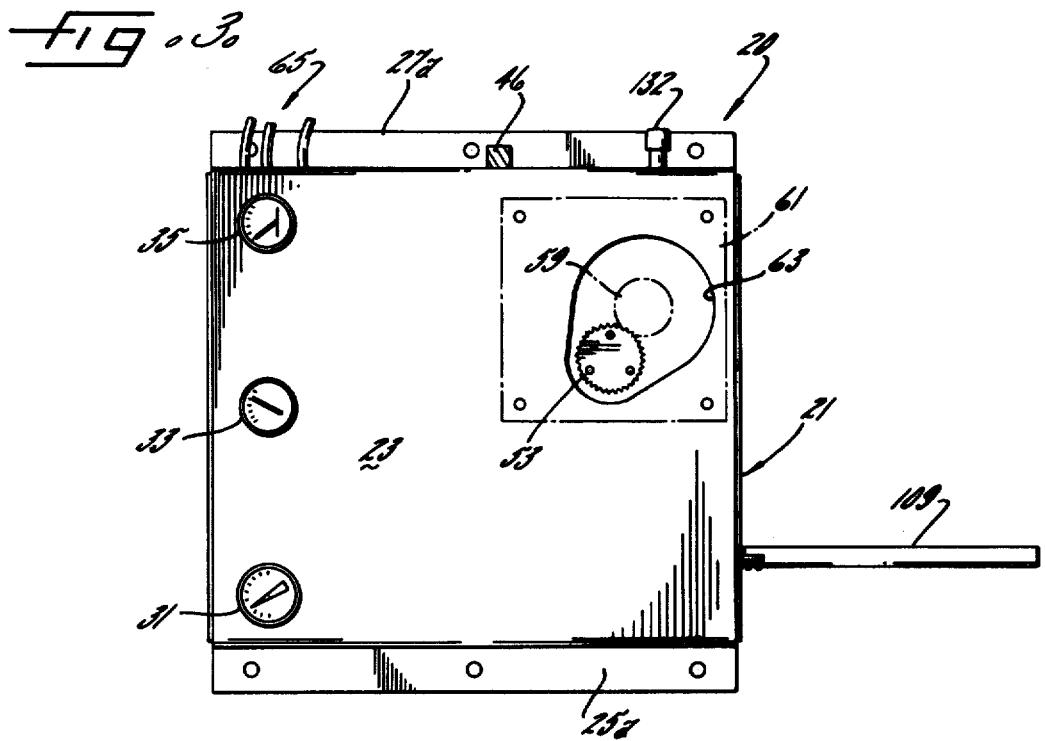
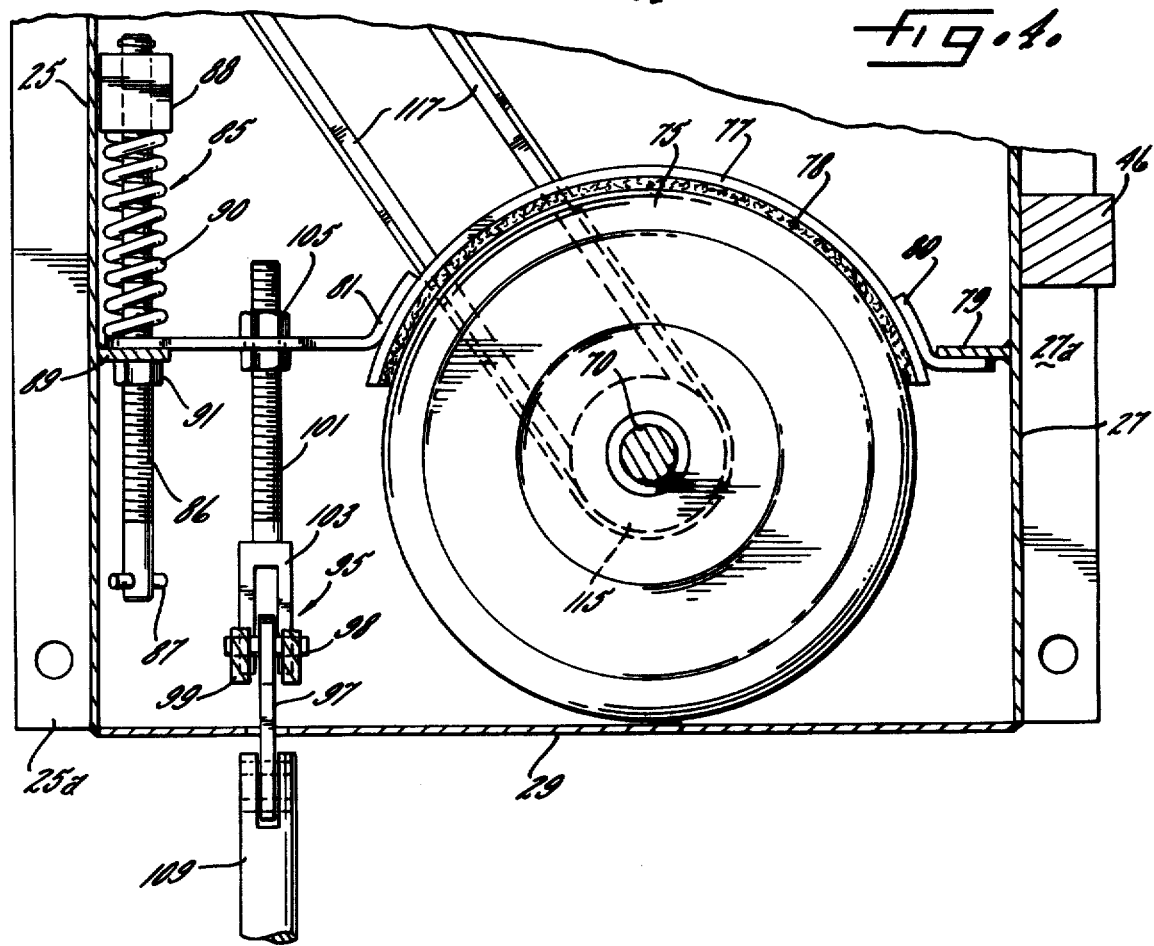

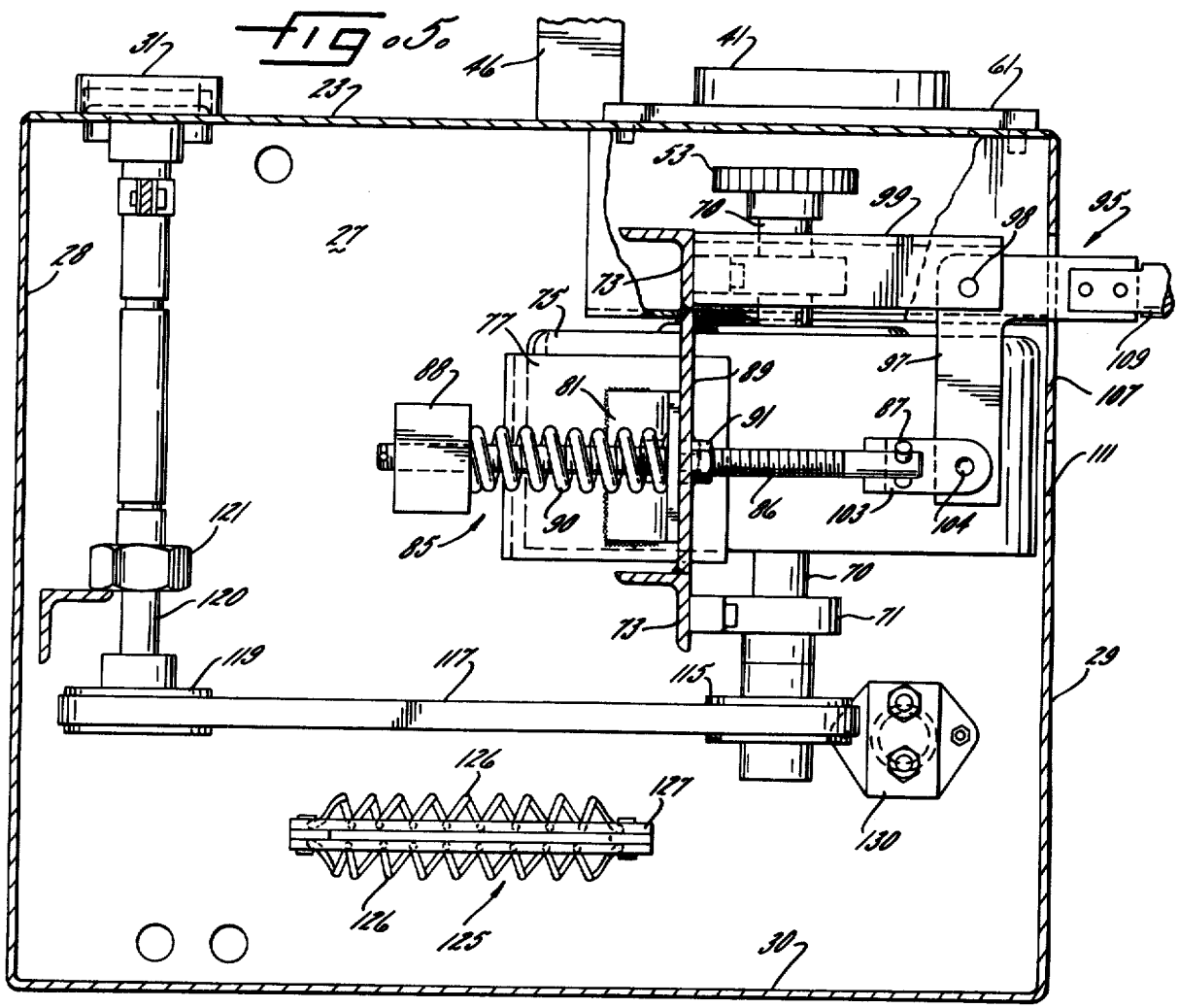

APPARATUS FOR TESTING STARTER MOTORS

BACKGROUND

This invention relates to test apparatus for electric starter motors particularly as adapted for use in starting automotive engines.

SUMMARY

In a preferred embodiment, there is provided a portable starter motor test apparatus having a generally box-like outer casing or housing prominently displaying a plurality of instrumentation on a top surface thereof. An engageable drive gear is exposed through an aperture in the top surface of the housing, the aperture being fitted with a mounting adapter ring for use in combination with a mounting clamp assembly for mounting an electric starter motor to the test apparatus. Electrical terminals can be provided on the housing for comprising connection means through which to electrically operate a selected starter motor. The drive gear is aligned to be engaged by a pinion gear of the starter motor and is mounted upon a rotatable main shaft interior to the housing. A cylindrical brake drum is concentrically and fixedly mounted on the main shaft for rotation therewith when the starter motor is operating. An outer brake shoe with lining is adapted for pivotable movement to engage the brake drum. Adjustable spring means biases the brake shoe in a direction onto the drum and separate lever means is effective to bias the brake shoe onto the drum when moved in a first direction and away from engagement with the drum when moved in a second and opposite direction. An electrical resistor field is provided to simulate a low voltage source.

It is a primary object of the invention to provide an improved test apparatus for testing automotive starter motors having increased adaptability to test a variety of different starter motors under preset torque loads and including expedient means of varying the preset torque load.

It is another object of the invention to provide improved adjustably spring biasing means for permitting a preset torque load to be applied to the starter motor and positionable lever means having handle means movable to optionally lessen or increase the preset torque load.

It is a further object to provide limited access to the adjustable spring biasing means for discouraging unauthorized adjustments thereof.

DRAWING

FIG. 1 is a frontal perspective view of the test apparatus of the present invention showing in dashed lines a starter motor mounted thereon and a dc voltage source;

FIG. 2 is a partial cross-sectional view of the test apparatus generally taken along the line 2—2 of FIG. 1;

FIG. 3 is a top view of the test apparatus generally taken along the line 3—3 of FIG. 2;

FIG. 4 is a fragmentary sectional view taken along the line 4—4 of FIG. 2;

FIG. 5 is a partial cross-sectional view taken along the line 5—5 of FIG. 2;

FIG. 6 is an enlarged fragmentary view of the upper right-hand portion of FIG. 5 with selected portions removed for clarity of illustration; and FIG. 7 is an exploded perspective view of selected operational parts of the test apparatus.

DETAILED DESCRIPTION

FIG. 1 shows a generally portable starter motor test apparatus or stand 20 in the form of a box-like outer casing or housing 21 having a top wall 23, a pair of opposite side walls 25 and 27, a pair of end walls 28 and 29 and a bottom wall 30 (see FIG. 2). The side walls 25 and 27 are provided with outwardly turned flanges 25a and 27a along their lower edge portions by which to conveniently mount the test stand 20 upon an underlying support surface. A plurality of instrumentation is mounted through the top wall 23, such as a tachometer 31, an ammeter 33 and a dc voltmeter 35, for providing means of measuring and monitoring the electrical characteristics and performance of a selected starter motor 37. As shown in FIGS. 1 and 2, the starter motor 37 to be tested is mounted on the top wall 23 by means of the facility of being captured between an adapter ring 41 and a threaded clamp assembly 43. The starter motor 37 is then electrically connected as through the use of cables 45 to a suitable power source such as a 12 volt dc battery 47 for permitting the starter motor 37 to be tested in an operating mode. The dc battery 47 is particularly useful for field test applications, however, when a more permanent test set-up is applicable, it is more desirable to utilize as the starter power source a standard 220 volt power pack transformer coupled with an ac to dc converter circuit.

The threaded clamp assembly 43 is rotatably suspended over the starter motor 37 by means of a cross-arm member 44 attached at one end thereof to an upright post member 46 and having a threaded node 48 at its free end portion. The clamp assembly 43 is rather simple in its design but is exceptionally utilitarian in clamping a variety of different size starter motors onto the appropriate adapter ring. The clamp assembly 43 includes a threaded stem portion 43a, an upper handle portion 43b and a lower U-shaped clamp plate 43c which is intended to engage the casing of the starter motor 37. The adapter ring 41 is particularly designed to accommodate the casing dimensions and throat structure of the drive end of a selected starter motor, as shown in FIG. 2. More specifically the vertical position of the pinion gear 51 must permit threaded engagement with an interiorly mounted primary drive gear 53. It can be readily seen that the height of the adapter ring 41 is related to the vertical positioning of the pinion gear 51, while the mean diameter of the adapter ring 41 can be perculiarly adapted to mount an associated starter motor 37. Further, the adapter ring 41 is stablized with respect to the housing 21 through providing that a reduced diameter portion 41a, FIG. 7, be telescopically received with an opening 59 in an accompanying adapter plate 61. The adapter plate 61 is intended to be fixedly attached to the top wall 23 of the housing 21 and serves as a covering over a larger aperture 63 in the top wall 23. It is therefore to be understood that the adapter ring 41 and the adapter plate 61 are hence removable and positionable as a unit as determined by the type and model of starter motor 37 under test.

FIG. 3 shows a top view of the test stand 20 wherein the adapter plate 61 with its central aperture 59 is illustrated in dashed lines for demonstrating its relationship to the aperture 63 of the top wall 23. It is seen that the primary drive gear 53 is entirely exposed through the aperture 63 but only a smaller circumferential edge portion thereof is exposed through the smaller overlying aperture 59 in the adapter ring 61. The drive gear 53 is provided with a plurality of openings 55 preferably with inner threads for threadingly receiving connector pins (not shown) whereby an auxiliary drive gear 57, FIG. 7, can be suspended above the primary drive gear 53 for the purpose of providing an alternative set of gear teeth. This arrangement is believed to provide the present invention with increased flexibility for permitting testing of a variety of different starter motors. Also, there is shown at 65 in FIG. 3 a plurality of instrumentation leads.

Referring generally to the drawing, the primary drive gear 53 is mounted to an upper end portion of a main shaft 70, itself rotatable mounted by suitable bearings 71 to a pair of spaced interior brace members 73. Generally, on the central portion of the main shaft 70, a cylindrical brake drum 75 of a conventional configuration is concentrically and fixedly mounted for simultaneous rotation when the starter motor is operating. A conventional outer brake shoe 77 with lining 78 is provided with suitable concavity to permit uniform frictional engagement with the outer surface of the brake drum 75. The brake shoe 77 operates to control the speed of rotation of the brake drum 75 and is pivotably mounted at one end thereof to a first wall brace 79 by a flexible leaf spring 80. A leaf extension member 81 is attached as by spot welding to the opposite end of the brake shoe 77, which opposite end constitutes a free end portion of the pivotable brake shoe 77. Spring biasing means 85 are provided for adjusting the position of the free end portion of the brake shoe 77 so that a preset measurable load or braking condition in the form of frictional drag can be produced between the brake drum 75 and the brake shoe 77.

With particular reference to FIGS. 4 and 5, the spring biasing means 85 is conveniently mounted to the side wall 25 of the housing 21 by means of a second wall brace 89 and includes an adjustable first threaded shaft or bolt 86 carrying a captured pin 87 comprising handle means, an end block 88, a coil spring 90 and a standard nut 91 carried on the threaded shaft 86. The coil spring is positioned between the end block 88 and the extension member 81. The tension on the coil spring 90 and thus on the brake shoe 77 via the extension member 81 can be adjusted through rotation of the shaft 86 with respect to the nut 91. In order to test a given starter motor at a preselected torque load, a torque wrench (not shown) can be used to turn the main shaft 70 and the brake drum 75 while simultaneously adjusting the tension of the coil spring 90 until the frictional drag of the shoe 77 on the drum 75 produces the preselected torque load as read on the torque wrench. It is in accordance with one aspect of the invention to provide that the shaft 86 of the spring biasing means 85 is terminated interiorly to the housing 21 so that once the preset torque load is adjusted and set for the testing of a known type starter motor, the shaft 86 is not readily accessible for changing such setting.

Now, FIGS. 4–6 disclose an additional adjustment for optionally lessening or increasing the torque loading of the brake shoe 77 on the drum 75. Accordingly, there is provided pivotable lever means 95 which is designed to be operative from exterior access to the housing 21. The lever means 95 includes an L-shaped lever arm 97 mounted interior to the housing 21 and having an axis of rotation about a pin 98 located in the elbow of the lever arm 97 and suspended between a pair of spaced apart interior brace members 99. A second threaded shaft or bolt 101 is coupled by a coupler 103 and pin 104 to a lower end portion of the lever arm 97 and is attached by a pair of standard nuts 105 to the extension member 81 for causing pivotal movement of the brake shoe 77 with axial movement of the shaft 101.

The other end of the lever arm 97 is extended through a suitable vertically extending elongated slot 107 in the end wall 29 and then attached to an exterior handle 109 which is generally elongated for the purpose of multiplying the force which can be applied to the brake shoe 77. It is therefore in accordance with another aspect of the invention that the exterior handle is effective when rotated downwardly in the direction of the arrow 110 in FIG. 6 to lessen the preset torque load which the brake shoe 77 applies to the drum 75 and even to provide zero torque load or a free running drum 75 and further is effective when rotated upwardly in the direction of the arrow 112 in FIG. 6 to increase the torque load and even to provide a fully locked drum 75 (full load). The preset torque load for a selected starter motor normally corresponds to its rated load condition. An essentially free running starter motor can thereafter be tested as well as checking the starter motor's performance under an essentially locked condition. It is this latter test condition which is known to provide an indication of an open armature as the armature is then turning very slowly. Additionally, the end wall 29 can be provided with an access opening 111 which will permit the entry of a special tool (not shown) into the housing 27 for varying the preset torque load through adjustment of the shaft 86 of the spring biasing means 85.

Further provided on the main shaft 70 generally at the opposite end thereof from the primary drive gear 53 is a drive pulley 115. A suitable drive belt 117 such as a standard V-belt is connected from the drive pulley 115 to a follower pulley 119 connected to a drive shaft 120 for the tachometer 31. The drive shaft 120 is suitable mounted by bearings such as the bearing 121 in FIG. 5. Quite apparently, the pulleys 115 and 119 can be of the same diameter or of offset diameter in order to obtain a desired relationship between the rotational speed (rpm) of the starter motor 37 and the rpm reading of the tachometer 31. Still further, the test stand 20 is provided with a resistor field or bank 125 having a plurality of resistive wire coils 126 mounted on a framework 127. The resistor bank 125 is connectible into the power circuit of the starter motor 37 by depressing or activating a push-button type connector terminal 130 and is effective to lower the voltage supplied to the starter motor in an approximation of a low voltage source such as a weak automotive battery being connected to a starter motor. The depression of another push-button connector terminal 132 is effective to remove the resistor bank 125 from the power circuit and the starter motor 37 is then supplied full power.

The starter motor test stand 20 of the present invention has been described in detail in order to point out with particularity the novelty and advantages thereof over the known prior art devices. The test stand 20 is useful for testing many different configurations and types of starter motors by virtue of the various adapter rings 41 and the provisions of both a primary drive gear 53 and an auxilliary drive gear 57. The test stand 20 can be adjusted to test any given normal torque load rating of a starter motor, and the torque adjusting means is made relatively secure from inadvertent or unauthorized readjustment. Lever means is conveniently provided exteriorly of the housing 21 whereby the preset torque load can be manually lessened and/or increased for facilitating the conductance of other performance tests under variable load conditions without having to disturb the preset torque load setting. It is to be understood that while the present invention has been shown and described with reference to the preferred embodiment thereof, the invention is not limited to the precise form set forth, and that various modifications and changes can be made therein without departing from the spirit and scope thereof.

What is claimed is:

1. A starter test stand apparatus for testing performance characteristics of electric starter motors under presettable torque loads comprising a housing enclosure, a revoluble shaft mounted in the housing, a brake drum revolubly mounted on the shaft, a brake shoe with lining pivotably mounted within the housing for engagement with the brake drum, adjustable spring biasing means carried by the housing and including a spring device biasing the free end portion of the brake shoe in a direction toward the drum and rotatable bolt means for selectively compressing or releasing compression of the spring device thereby to set a predetermined fixed braking force on the drum, and separate positionable lever means carried by the housing and including an exteriorly exposed handle device, linkage means connected to the free end portion of the brake shoe and a pivotable lever arm interconnecting the same for translating movement of said handle device in a first direction into movement of said brake shoe against the brake drum and movement thereof in a second direction into movement of the brake shoe away from the brake drum whereby other braking forces can be applied against the brake drum without readjustment of the bolt means.

2. A starter test stand apparatus as claimed in claim 1 wherein said starter motor includes gear means and a cylindrical motor casing, a clamp assembly is mounted with respect to the starter test stand housing for suspension above a first housing wall thereof, said clamp assembly including post means extendable from said housing, bolt means threadedly mounted to the post means and a clamp plate attached to the bolt means for engaging one end of the cylindrical motor casing with a suitable extension movement of the bolt means, drive gear means mounted on said revoluble shaft, said first housing wall defining an aperture therein exposing therethrough said drive gear means for engagement by the gear means of said starter motor, an adapter plate mountable on said first housing wall and defining an aperture therein positioned in communication with said first housing wall aperture, an adapter ring mountable on said adapter plate in further communication with the first housing wall aperture and engageable with the other end of the motor casing, said adapter ring being at least partially received within the adapter plate aperture for mounting stability and having a length dimension calculated to align the gear means of said starter motor to mesh with said drive gear means.

3. A starter test stand apparatus as claimed in claim 2 wherein a second drive gear means is provided to align and mesh with the gear means of said starter motor in an alternate gear meshing arrangement and is mountable to said drive gear means in concentric fashion.

4. A starter test stand apparatus as claimed in claim 2 wherein said clamp plate is generally U-shaped and is carried by said bolt means with its opening oriented to receive the insertion of the surface irregularities of said one end of the starter motor casing.

5. A starter test stand apparatus as claimed in claim 1 wherein said rotatable bolt means for selectively compressing or releasing compression of the spring device is accessible for rotational adjustment interiorly of the housing.

* * * * *